United States Patent
Kawahara et al.

(10) Patent No.: US 10,831,364 B2
(45) Date of Patent: Nov. 10, 2020

(54) TERMINAL DEVICE

(71) Applicant: FUJITSU CLIENT COMPUTING LIMITED, Kawasaki-shi, Kanagawa (JP)

(72) Inventors: Masanori Kawahara, Kawasaki (JP); Makoto Suzuki, Kawasaki (JP); Rie Hasada, Kawasaki (JP)

(73) Assignee: FUJITSU CLIENT COMPUTING LIMITED (JP)

( * ) Notice: Subject to any disclaimer, the term of this patent is extended or adjusted under 35 U.S.C. 154(b) by 0 days.

(21) Appl. No.: 16/445,397

(22) Filed: Jun. 19, 2019

(65) Prior Publication Data

US 2019/0302983 A1 Oct. 3, 2019

Related U.S. Application Data

(63) Continuation of application No. PCT/JP2018/000945, filed on Jan. 16, 2018.

(30) Foreign Application Priority Data

Jan. 19, 2017 (JP) ................. 2017-007705

(51) Int. Cl.
*G06F 3/041* (2006.01)
*G06F 3/045* (2006.01)
(Continued)

(52) U.S. Cl.
CPC .......... *G06F 3/0488* (2013.01); *G06F 3/1423* (2013.01); *G06F 21/32* (2013.01); *G06F 21/572* (2013.01); *G06T 1/00* (2013.01)

(58) Field of Classification Search
CPC .......................... G06F 21/32; G06K 9/00087
See application file for complete search history.

(56) References Cited

U.S. PATENT DOCUMENTS

| | | | |
|---|---|---|---|
| 2009/0160883 A1 | 6/2009 | Sonobe | |
| 2016/0054971 A1 | 2/2016 | Yu et al. | |

(Continued)

FOREIGN PATENT DOCUMENTS

| | | | |
|---|---|---|---|
| JP | 2014215868 A | * | 11/2014 |
| JP | 2016-177404 A | | 10/2016 |

(Continued)

OTHER PUBLICATIONS

International Search Report for Patent Application No. PCT/JP2018/000945, dated Mar. 6, 2018 (2 pages).

(Continued)

*Primary Examiner* — Nan-Ying Yang
(74) *Attorney, Agent, or Firm* — Harness, Dickey & Pierce, P.L.C.

(57) ABSTRACT

A terminal device is provided that has a collation unit, a specification unit, and a display unit. The collation unit: references a storage unit that stores built-in display information that specifies a built-in display and a plurality of pieces of external display information that specify a plurality of connected external displays; and collates the built-in display information and the plurality of pieces of external display information. On the basis of the results of the collation, the specification unit specifies a display that has a specific positional relationship with a reading device for biological information. The display unit displays, on the specified display, a screen for touch locations that represent a read operation for the biological information.

2 Claims, 13 Drawing Sheets

(51) Int. Cl.
*G06F 3/0488* (2013.01)
*G06F 3/14* (2006.01)
*G06F 21/32* (2013.01)
*G06F 21/57* (2013.01)
*G06T 1/00* (2006.01)

(56) References Cited

U.S. PATENT DOCUMENTS

2016/0328597 A1 11/2016 Abiko et al.
2018/0046423 A1* 2/2018 Abraham .............. G06F 3/1423

FOREIGN PATENT DOCUMENTS

JP 2016-212636 A 12/2016
WO WO-2013/145491 A1 10/2013

OTHER PUBLICATIONS

Extended European Serach Report for Patent Application No. EP 18741281.2 dated Sep. 21, 2020 (7 pages).

* cited by examiner

FIG. 6

| No. | Handle | Manufacturer Name | Product Id | Serial Number |
|-----|--------|-------------------|------------|---------------|
| 1 | 0001 | "ABC" | "1234" | "567" |
| 2 | 0002 | "FUJ" | "5612" | "280" |
| 3 | 0003 | "CDE" | "9876" | "543" |
| max | ... | ... | ... | ... |

39

TERMINAL DEVICE

This application is a continuation application of PCT International Application No. PCT/JP2018/000945, filed on Jan. 16, 2018, which claims priority from Japanese Patent Application No. 2017-007705, filed on Jan. 19, 2017. The entire content of both the above PCT International Application and the above Japanese Application are incorporated herein by reference.

FIELD OF THE INVENTION

The present invention relates to a terminal device.

DESCRIPTION OF RELATED ART

Among portable terminals such as tablet terminals and the like, there are devices that are equipped with a biometric authentication function (see, for example, Japanese Unexamined Patent Application, First Publication No. 2016-212636). Japanese Unexamined Patent Application, First Publication No. 2016-212636 discloses a terminal device in which, instead of having a camera that can read biometric information at once, a line scan camera is provided on a lateral side of a display, and the palm of the hand is moved over the line scan camera to read the biometric information. As a result thereof, space is saved.

In Japanese Unexamined Patent Application, First Publication No. 2016-212636, in order to reduce biometric information reading errors when moving the palm of the hand, touch areas indicating the positions at which the fingers are to be placed are presented on the display, and the fingers are moved in accordance with the touch areas, thereby causing the palm of the hand to pass over the line scan camera and allowing biometric information to be acquired from the palm of the hand.

However, in terminal devices such as tablet terminals, an externally provided display (hereinafter referred to as an "external display") is sometimes connected to the terminal device in addition to a display (hereinafter referred to as an "internal display") that is internally provided within the terminal device. In this case, if a screen indicating touch areas is presented on the external display, then biometric information cannot be acquired from the hand even if the fingers are moved in accordance with the displays of the touch areas, because a line scan camera is not installed in the external display.

SUMMARY OF THE INVENTION

Therefore, according to one aspect, a purpose of the present invention is to present a screen indicating touch areas on a display that is able to read biometric information.

In one embodiment, the present invention provides a terminal device comprising: a collation unit that references a storage unit storing a set of internal display information for identifying an internal display and multiple sets of display information for identifying multiple displays that are connected, and that collates the set of internal display information with the multiple sets of display information; an identification unit that, based on results from the collation, identifies a display having a specific positional relationship with respect to a biometric information reading device; and a display unit that presents, on the identified display, a screen having a touch area indicating a biometric information reading operation.

BRIEF DESCRIPTION OF THE DRAWINGS

FIG. 6 is a diagram illustrating an example of a display list table according to one embodiment.

BRIEF DESCRIPTION OF THE INVENTION

Hereinafter, embodiments of the present invention will be explained with reference to the attached drawings. In the present specification and drawings, structural elements having substantially the same functional structure will be indicated by appending the same reference signs, thereby eliminating redundant explanations.

Biometric Authentication

In biometric authentication, personal verification is performed by using characteristic biometric information that is different in each individual, such as fingerprints, the face, the palms of the hands, the irises and veins. For example, in palm authentication, biometric authentication is performed by using biometric information such as handprints, hand shapes and veins in the palms. In the following explanation, an example of palm authentication in a terminal device equipped with a biometric authentication function, such as a tablet terminal, will be explained, but the biometric authentication need not be limited to palm authentication.

The terminal device according to one embodiment of the present invention may have a biometric information reading device and a biometric authentication device installed therein. The biometric information reading device may be included in the biometric authentication device.

Terminal devices include PCs (personal computers), tablet terminals, smartphones and portable terminals. In the examples indicated below, the terminal device 1 is a portable terminal such as a tablet terminal or a smartphone.

Figure 1:
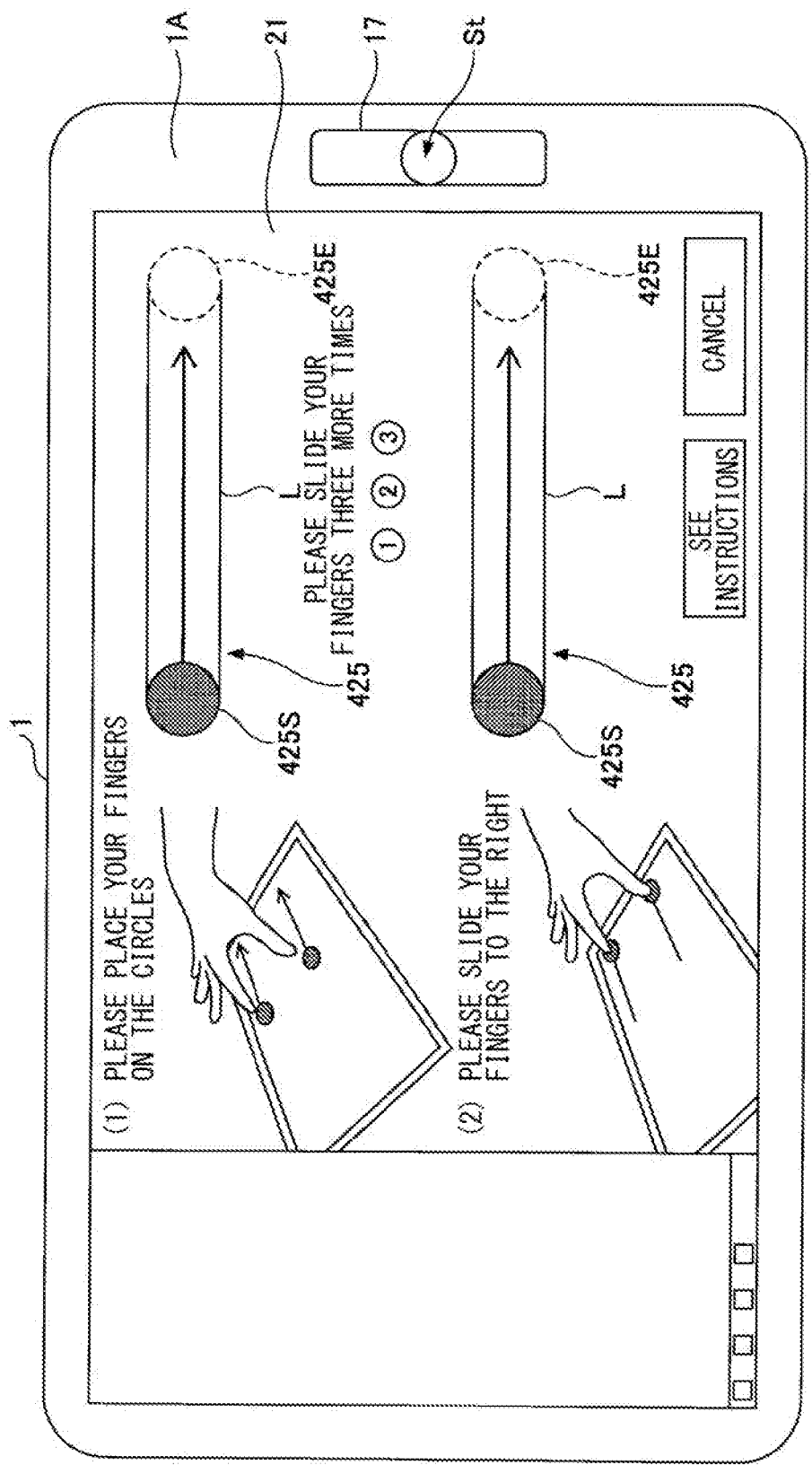
FIG. 1 is a diagram illustrating an example of a guidance screen of a terminal device according to one embodiment.

Guidance Screen First, an example of a guidance screen in the terminal device 1 according to the present embodiment will be explained with reference to FIG. 1. The terminal device 1 that is equipped with a biometric authentication function captures an image of a living body by means of, for example, a camera 17 provided in a housing 1A. In this example, in the terminal device 1, an internal display 21 having a touch panel laminated thereon is provided on the upper surface of a housing 1A having a substantially rectangular shape in plan view, and a camera 17 is provided at a position at the center of a lateral side of the housing 1A surrounding the internal display 21. However, the position of the camera 17 is not limited thereto, and it may be provided at any position on the housing 1A. In the terminal device 1, space is saved by moving the palm of the hand over the camera 17 to read biometric information.

In order to reduce biometric information reading errors when moving the palm of the hand, finger touch areas 425 are presented on the internal display 21. The touch areas 425 that are presented on the internal display 21 include circular starting guide buttons 425S indicating starting points at which the fingers are to be placed, and circular end guide buttons 425E indicating end points at which the fingers are to be placed. Additionally, the display of the touch areas 425 includes guide lines L over which the fingers are to be slid from the starting guide buttons 425S to the end guide buttons 425E, and arrows indicating the directions in which the fingers are to be slid. In the presented example, by moving two fingers from the starting guide buttons 425S to the end guide buttons 425E in accordance with the two touch areas 425, the palm of the hand is made to pass over the camera 17, allowing palm biometric information to be acquired.

Connecting Multiple Displays

An external display other than the internally provided display may also be connected to the terminal device 1 such as a tablet terminal. When a guidance screen indicating touch areas 425 is presented on the internal display 21 of the terminal device 1 as illustrated in FIG. 1, palm biometric information can be acquired by performing the touch operation in accordance with the touch areas 425 and having the camera 17 capture images of the palm of the hand.

Figure 2:
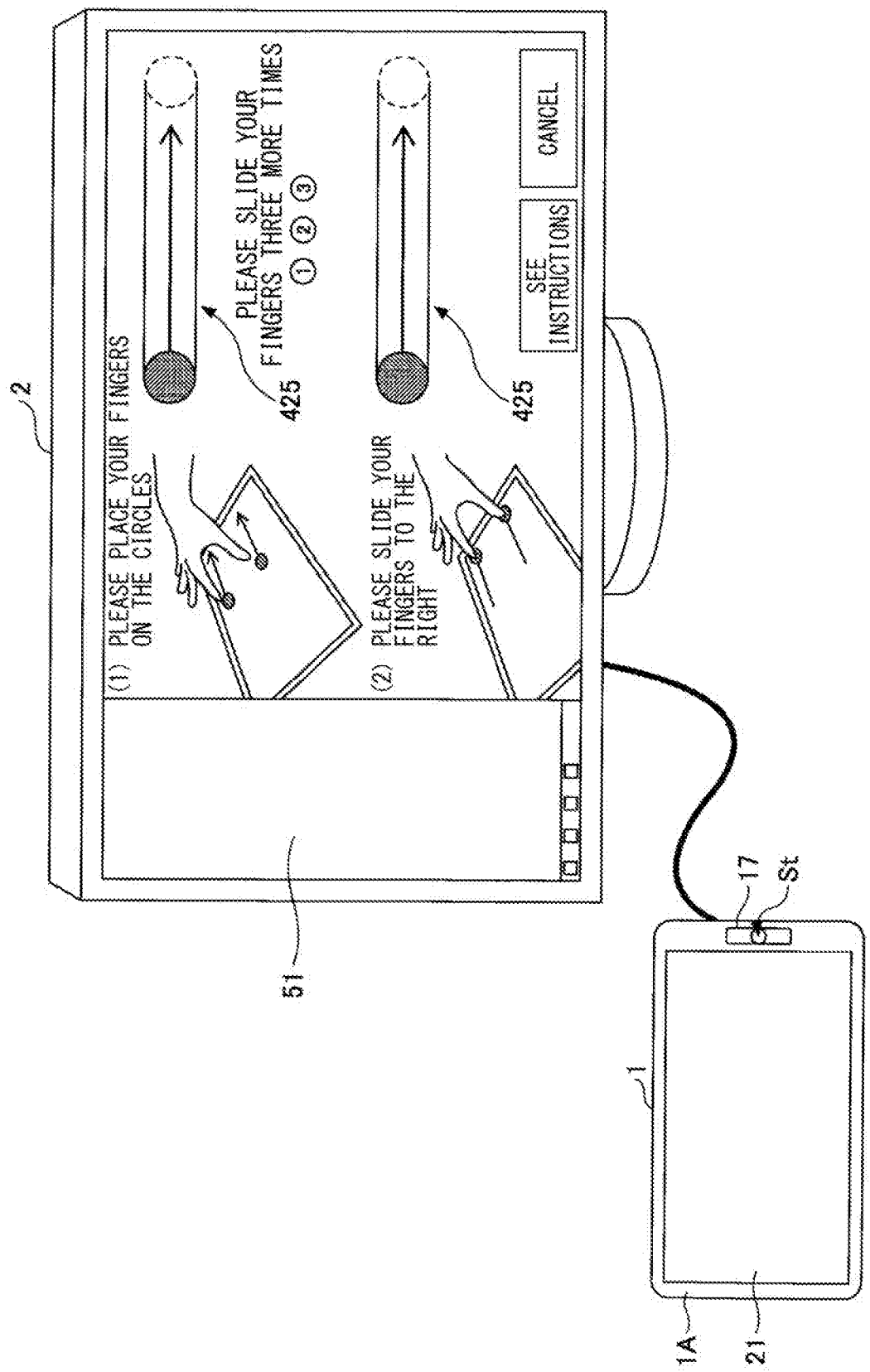
FIG. 2 is a diagram illustrating an example of a guidance screen presented on an external display.

On the other hand, when multiple displays are connected to the terminal device as illustrated in FIG. 2, the guidance screen indicating the touch areas 425 could be presented on the display 51 of an externally provided display device 2 rather than the internal display 21. In this case, there is no camera to the side of the external display 51. For this reason, palm biometric information cannot be acquired even if a user performs a touch operation in accordance with the touch areas 425 presented on the external display 51.

There are differences in the types of panels used in internal displays 21 depending on the product and the device, as well as the connection conditions of external displays 51, and the guidance screen having the touch areas 425 must be presented on the internal display 21 in the case of all of these different conditions.

Therefore, if multiple displays are connected to the terminal device 1, the terminal device 1 according to the present embodiment identifies, from among the multiple displays, the internal display, which is the display that is specific to the terminal device 1. Furthermore, the terminal device 1 presents the guidance screen having the touch areas 425 on the internal display specific to that terminal device 1. As a result thereof, it is possible to present the screen having the touch areas on a display that is able to read biometric information. Hereinafter, the structure of the terminal device 1 according to the present embodiment and the control of the display presenting the touch areas 425 will be explained.

Hardware Structure

Figure 3:
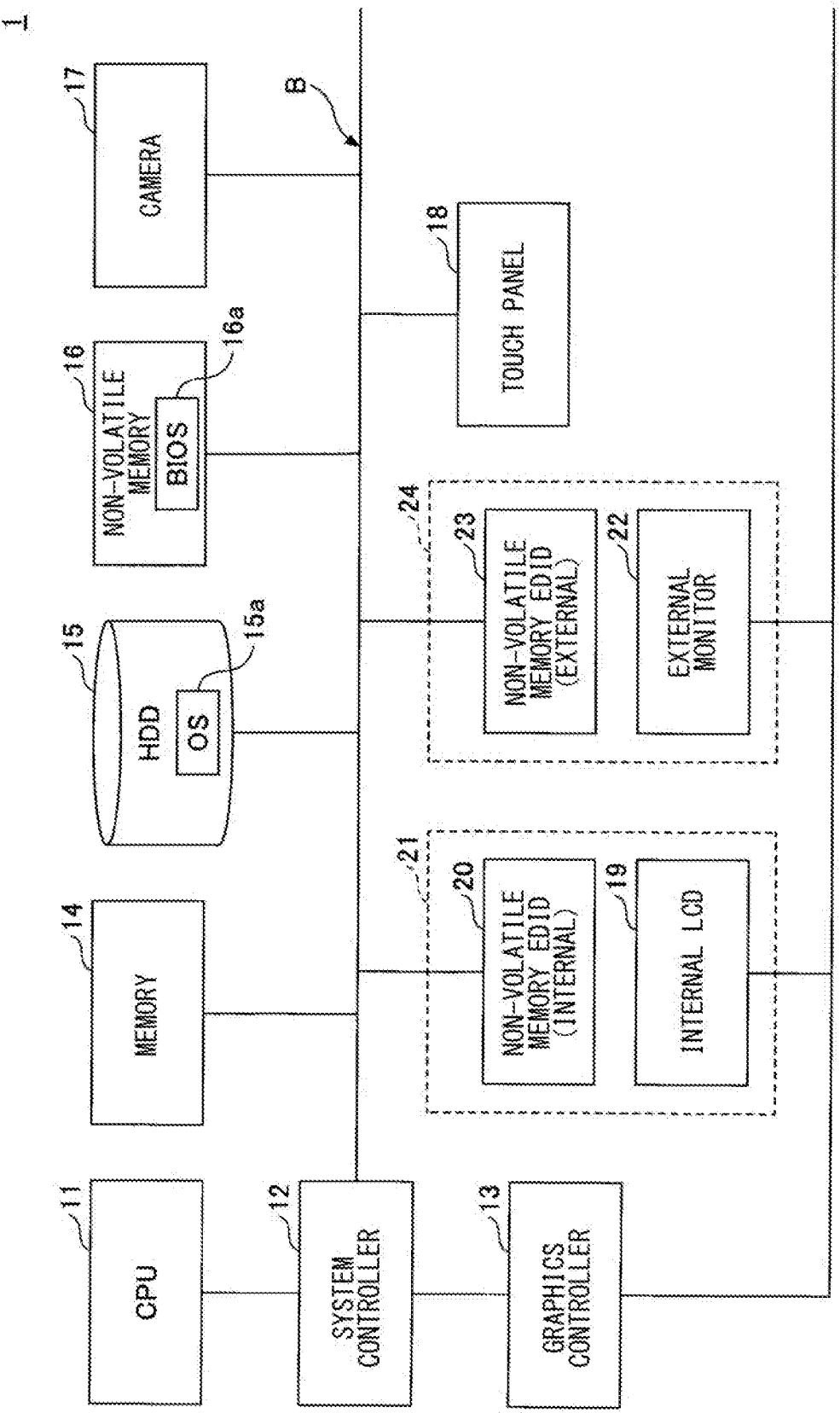
FIG. 3 is a diagram illustrating an example of the hardware structure of a terminal device according to one embodiment.

First, an example of the hardware structure of the terminal device 1 according to the present embodiment will be explained with reference to FIG. 3. The terminal device 1 has a CPU (Central Processing Unit) 11, a system controller 12, a graphics controller 13, a memory 14, an HDD (Hard Disk Drive) 15, a non-volatile memory 16, a camera 17, a touch panel 18, an internal display 21 and an external display 24.

If the terminal device 1 has a communication function, it may further have a well-known communication interface for transmitting and receiving signals. Additionally, if the terminal device 1 has the function of connecting to an external network such as the internet, it may further have a well-known external interface.

The system controller 12 controls the entire terminal device 1. The system controller 12 is connected to a CPU 11. Additionally, the system controller 12 is connected, via a bus B, to the graphics controller 13, the memory 14, the HDD 15, the non-volatile memory 16, the camera 17, the touch panel 18, the internal display 21 and the external display 24. Furthermore, an expansion slot such as, for example, a PCI Express slot or a PCI slot, may be connected to the bus B.

The CPU 11 can run computer programs, including an authentication processing program, to implement various functions of the terminal device 1 including biometric authentication. Additionally, the CPU 11 can run a display control program to implement a function for controlling the display on which the touch areas 425 are to be presented.

The graphics controller 13 controls the internal display 21 and the external display 24 in accordance with instructions from the CPU 11 via the system controller 12, and presents various screens, such as presenting the touch areas 425.

The memory 14 may store computer programs, including an authentication processing program and a display control program, to be run by the CPU 11, and various types of data. The memory 14 may comprise, for example, an SDRAM (Synchronous Dynamic Random Access Memory). The memory 14 is an example of a storage unit.

The HDD 15 stores various programs and various types of data. An OS 15a is contained in the HDD 15. Additionally, an application for controlling the display of the touch areas 425 is installed in the HDD 15.

A BIOS (Basic Input/Output System) 16a is contained in the non-volatile memory 16. The BIOS 16a runs a POST (Power-On Self Test, a self-diagnosis test) when the terminal device 1 is booted or rebooted by turning on a power supply. The POST includes device (peripheral device) initialization processes. When an initialization process is executed for a device, that device enters an active state. The non-volatile memory 16 may comprise, for example, an EEPROM (Electrically Erasable Programmable Read-Only Memory).

The camera 17 captures images of the palm of the hand as it moves above the camera 17 when the user touches the touch areas 425 on the internal display 21 and performs finger operations in accordance with guidance in the touch areas 425. The touch panel 18 is laminated onto the internal display 21 and detects the coordinates of positions touched by the user's fingers.

The camera 17 is an example of a biometric information reading device. The biometric information reading device may be formed from a camera 17 that captures images of, for example, a palm print, a hand shape, the face or the like. Additionally, the biometric information reading device may be formed from a near-infrared sensor (or near-infrared camera) including an image sensor (or camera), having sensitivity in the near-infrared wavelength region, for capturing images of, for example, the veins on the palm, the veins on the fingers, the irises or the like, and a near-infrared illumination light source. Additionally, the biometric information reading device may include both a camera having sensitivity in a wavelength region other than the near-infrared wavelength region, and a near-infrared sensor.

The internal display 21 is a display that has an internal LCD (Liquid Crystal Display) 19 and a non-volatile memory 20, and that is internally provided in the terminal device 1. In addition to symbols, diagrams, messages and the like, the internal display 21 presents touch areas 425 and the like, including touch position starting points and end points indicating user finger operation positions, user finger movement directions and touch position movement instructions. The non-volatile memory 20 stores information (Extended Display Identification Data, hereinafter referred to as "EDID information") specific to the internal LCD 19. The non-volatile memory 20 may comprise a ROM.

The external display 24 is a display that has an external monitor 22 and a non-volatile memory 23, and that is externally provided for the terminal device 1. The external display 24 presents symbols, diagrams, messages and the like. The non-volatile memory 23 stores information (EDID information) specific to the external monitor 22. The non-volatile memory 23 may comprise a ROM.

Functional Structure

Next, an example of the functional structure of the terminal device 1 according to the present embodiment will be explained with reference to FIG. 4. The terminal device 1 has a storage unit 31, an initialization processing unit 32, a registration unit 33, a list preparation unit 34, a collation unit 35, an identification unit 36 and a display unit 37.

Figure 5:
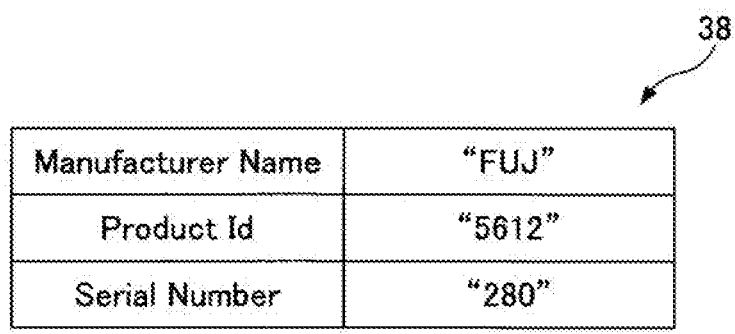
FIG. 5 is a diagram illustrating an example of an internal display information table according to one embodiment.

The storage unit 31 has an internal display information table 38 and a display list table 39. An example of the internal display information table 38 is shown in FIG. 5. An example of the display list table 39 is shown in FIG. 6.

The internal display information table 38 shown in FIG. 5 stores internal display information including the manufacturer's name (Manufacturer Name), a product ID (Product ID) and a device number (Serial No.). The internal display information is information that is specific to the terminal device 1.

The manufacturer's name is the name of the manufacturing company (for example, a panel manufacturing company or an external monitor or PC manufacturing company). The product ID is a product identifier and is a value that the manufacturing company assigns to products. The device number is a serial number that is assigned to each unit when manufacturing the displays.

The internal display information changes depending on the terminal device 1. Therefore, in the present embodiment, during the BIOS process that is executed when the terminal device 1 is booted or rebooted, the registration unit 33 illustrated in FIG. 4 acquires the EDID information stored in the non-volatile memory 20 in the internal display 21. Furthermore, the registration unit 33 selects internal display information from the EDID information and stores that information in the memory 14. As a result, each time the terminal device 1 is booted or rebooted, a manufacturer name, a product ID and a device number specific to the terminal device 1 are stored in the internal display information table 38 in the memory 14. The registration unit 33 acquires the manufacturer name, the product ID and the device number from the EDID information stored in the non-volatile memory 20 in the internal display 21, and may store the information in the memory 14 and the non-volatile memory 16. The registration unit 33 is implemented, for example, by means of the BIOS 16a.

In the present embodiment, the internal display information is a manufacturer name, a product ID and a device number, but the information need not be limited thereto. When only a manufacturer name is used, there may be cases in which it is difficult to differentiate an internal display 21 by the companies manufacturing an external monitor and a PC. However, an internal display 21 can be differentiated on the basis of information relating to the manufacturer name and a product ID. Thus, the internal display information need only include at least a manufacturer name and a product ID as the minimum information by which the internal display 21 can be differentiated. However, if the internal display information includes a manufacturer name, a product ID and a device number as in the present embodiment, then the internal display 21 can be more reliably differentiated because the values differ at the level of the individual units at the time of manufacture.

The internal display information may include, in addition to the manufacturer name and the product ID, not only the device number, but also the week manufactured (Week of manufacture) and the year manufactured (Year of manufacture). Both of these types of information can be acquired from the EDID information. The information regarding the week of manufacture and the year of manufacture is effective for differentiating the internal display 21 in situations such as when the correct value is not set for the product ID or the device number.

The initialization processing unit 32 is similarly implemented, for example, by means of the BIOS 16a. The initialization processing unit 32 runs a POST process when the terminal device 1 is booted or rebooted by turning the power supply on, and performs a device initialization process. The processing in the initialization processing unit 32 and the registration unit 33 is included in the BIOS process performed by the BIOS 16a.

During a POST process in the terminal device 1, it is common to use only the internal display 21 for display even if multiple displays are connected to the terminal device 1. For this reason, the registration unit 33 is able to acquire EDID information from the internal display 21 by using a protocol called GOP (Graphics Output Protocol). As a result thereof, it is possible to acquire the manufacturer name, the product ID and the device number included in the EDID information.

As explained above, during the BIOS process that is carried out each time the terminal device 1 is booted or rebooted, the manufacturer name, the product ID and the device number are acquired from the non-volatile memory 20 and saved in the memory 14 that can be referenced by the OS 15a. As a result thereof, an application that is operated on the OS 15a when control is transferred from the BIOS 16a to the OS 15a can access the memory 14 and acquire internal display information (manufacturer name, product ID and device number) which is specific to each terminal device 1.

As the memory region used in the memory 14, a candidate is a memory region defined by a System Management BIOS (SMBIOS). In the present embodiment, it will be assumed that the manufacturer name, the product ID and the device number (internal display information table 38) are saved to a memory region defined by the SMBIOS, and the method for writing in and reading from the memory region follow the SMBIOS specifications, so the details will be omitted.

As shown in FIG. 6, the display list table 39 stores information including list numbers (No.), handle names (Handle), manufacturer names (Manufacturer Name), product IDs (Product ID) and device numbers (Serial No.). The display list table 39 is stored in the memory 14. The display list table 39 may also store information regarding weeks of manufacture and years of manufacture.

Returning to FIG. 4, the list preparation unit 34 acquires, from the OS 15a, information on the displays that are connected to the terminal device 1 and active, and prepares a display list. As the means for acquiring, from the OS 15a, the information on the displays that are connected to the terminal device 1 and active, it is possible to use a standard API (Application Interface) of the OS 15a. The collation unit 35 collates the manufacturer names, the product IDs and the device numbers contained in the display list table 39 with those in the internal display information table 38 stored in the memory 14, which can be referenced by the OS 15a. As a result of the collation, the identification unit 36 identifies a display having a matching manufacturer name, product ID and device number as the internal display 21 specific to the terminal device. The display unit 37 presents a guidance screen having the touch areas 425, on the identified internal display.

In the present embodiment, a manufacturer name, a product ID and a device number are selected from EDID information as internal display information to be stored in the memory 14, but it is possible to add other categories such as the week of manufacture and the year of manufacture, or to delete existing categories such as the device number. For example, even if the device number is not stored in the memory 14, it is possible to identify the internal display from the list of displays that are connected by collating only the manufacturer name and the product ID. Additionally, the display list table 39 includes a handle that has been assigned to each device by the OS 15a as a category, but other categories may be added in accordance with the OS type.

The list preparation unit 34, the collation unit 35 and the identification unit 36 may each be implemented by means of processes that, for example, a display control program 40 stored in the storage unit 31 makes the CPU 11 execute. The display unit 37 may, for example, be implemented by means of an internal LCD 19 in the internal display 21.

Figure 4:
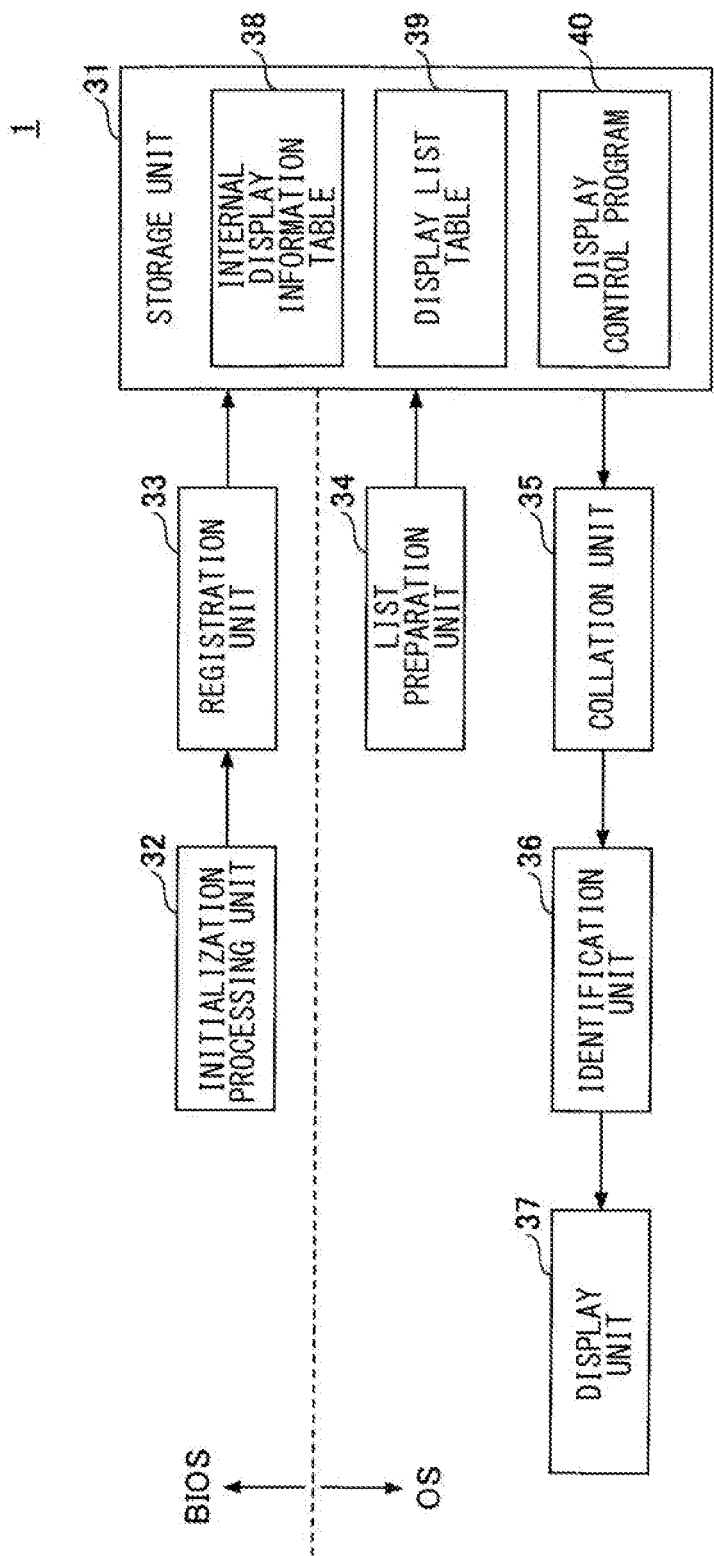
FIG. 4 is a diagram illustrating an example of the functional structure of a terminal device according to one embodiment.

FIG. 4 is a block diagram focusing on the functions, and a processor for running software for the respective units indicated by these functional blocks is hardware. The storage unit 31 may form a memory region inside the terminal device 1 or a database that can be connected to the terminal device 1 via a network. However, the internal display information table 38 is stored in the memory 14 in the terminal device 1.

Biometric Authentication Device

An example of the functional structure of a biometric authentication device 41 according to the present embodiment installed in the terminal device 1 according to the present embodiment will be explained with reference to FIG. 7. The biometric authentication device 41 according to the present embodiment has a biometric imaging unit 42, a feature extraction unit 43, an authentication unit 44 and a storage unit 45.

The biometric imaging unit 42 captures images containing user biometric information. The biometric imaging unit 42 may be implemented, for example, by means of a camera 17. The feature extraction unit 43 extracts feature information from the user biometric information images captured by the biometric imaging unit 42. The authentication unit 44 performs biometric authentication of the user by means of the extracted feature information.

In the biometric authentication process executed by the biometric authentication device 41, the authentication unit 44 compares and collates feature information that has been pre-registered in the storage unit 45 with the feature information extracted by the feature extraction unit 43 from the user biometric information captured by the biometric imaging unit 42 during personal verification. The authentication unit 44 determines whether or not the comparison/collation results indicate a match to within a predetermined threshold value range, and outputs a personal verification result. If the comparison/collation results indicate a match, then the authentication unit 44 determines that biometric authentication has succeeded and outputs a personal verification result indicating that the user is genuine.

The pre-registered feature information is sometimes called, for example, a registration template 46. In the registration process for the registration template, as in the case of the above-mentioned biometric authentication process, the feature extraction unit 43 extracts feature information from the user biometric information images captured by the biometric imaging unit 42. Furthermore, the registration template is registered by supplying the storage unit 45 with feature information extracted in this manner. The registration template registered in the storage unit 45 may be feature information that has been processed.

Figure 7:
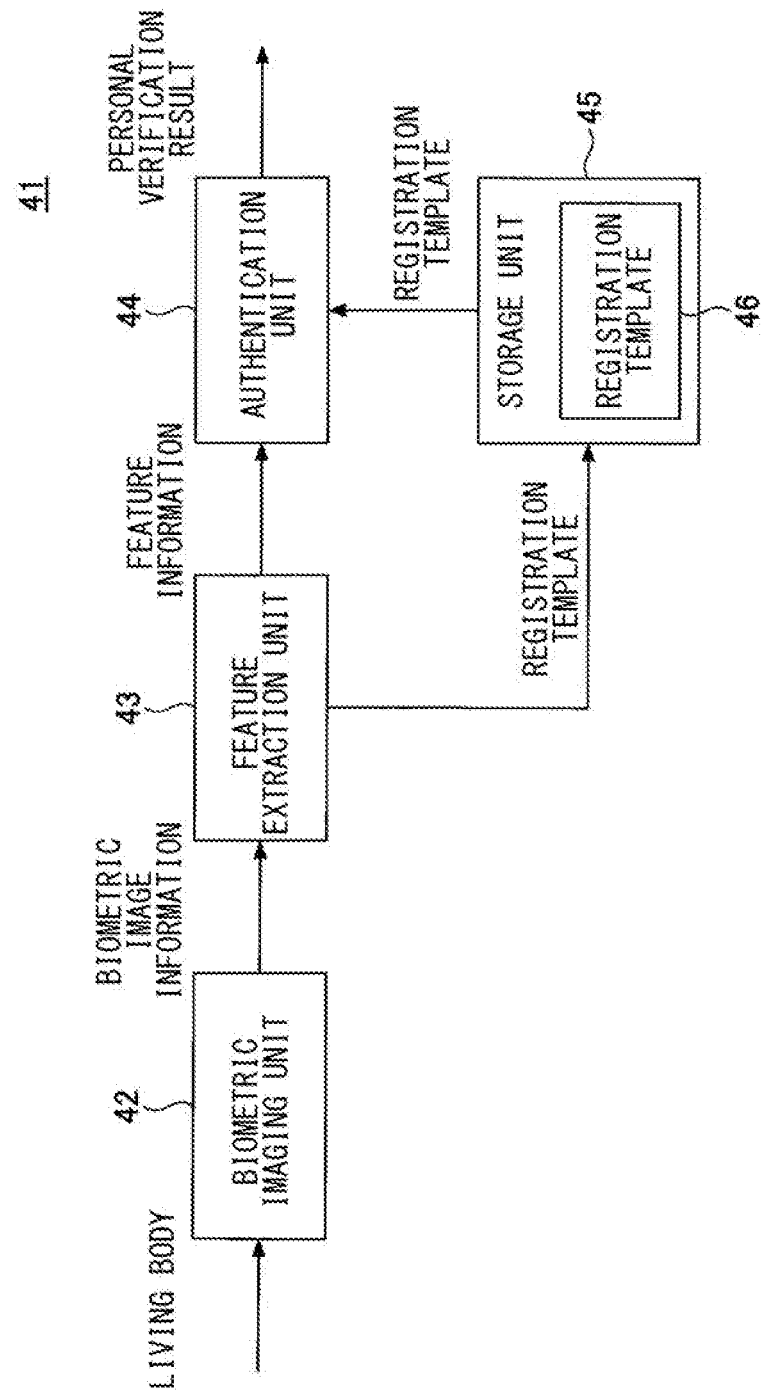
FIG. 7 is a diagram illustrating an example of the functional structure of a biometric authentication device according to one embodiment.

In the example in FIG. 7, the storage unit 45 is provided inside the biometric authentication device 41, but it may be contained in a storage unit outside the biometric authentication device 41. For example, an HDD (Hard Disk Drive), a flash memory or the like, which are examples of the storage unit 45, may be externally connected to the biometric authentication device 41 via an interface such as a USB (Universal Serial Bus). Additionally, the storage unit 45 may form a database that can be connected to the biometric authentication device 41 via a network. However, the internal display information table 38 is saved to the non-volatile memory 16 or the non-volatile memory 20 in the terminal device 1, and stored in the memory 14.

In the present embodiment, the functions of the feature extraction unit 43 and the authentication unit 44 in the biometric authentication device 41 are executed by a program. The above-mentioned authentication process is implemented in the terminal device 1 by running said program, which is installed in the terminal device 1, by means of the CPU 11.

Biometric Information Reading Operation

Next, an example of a biometric information reading operation will be explained with reference to FIG. 8 to FIG. 10.

Figure 8:
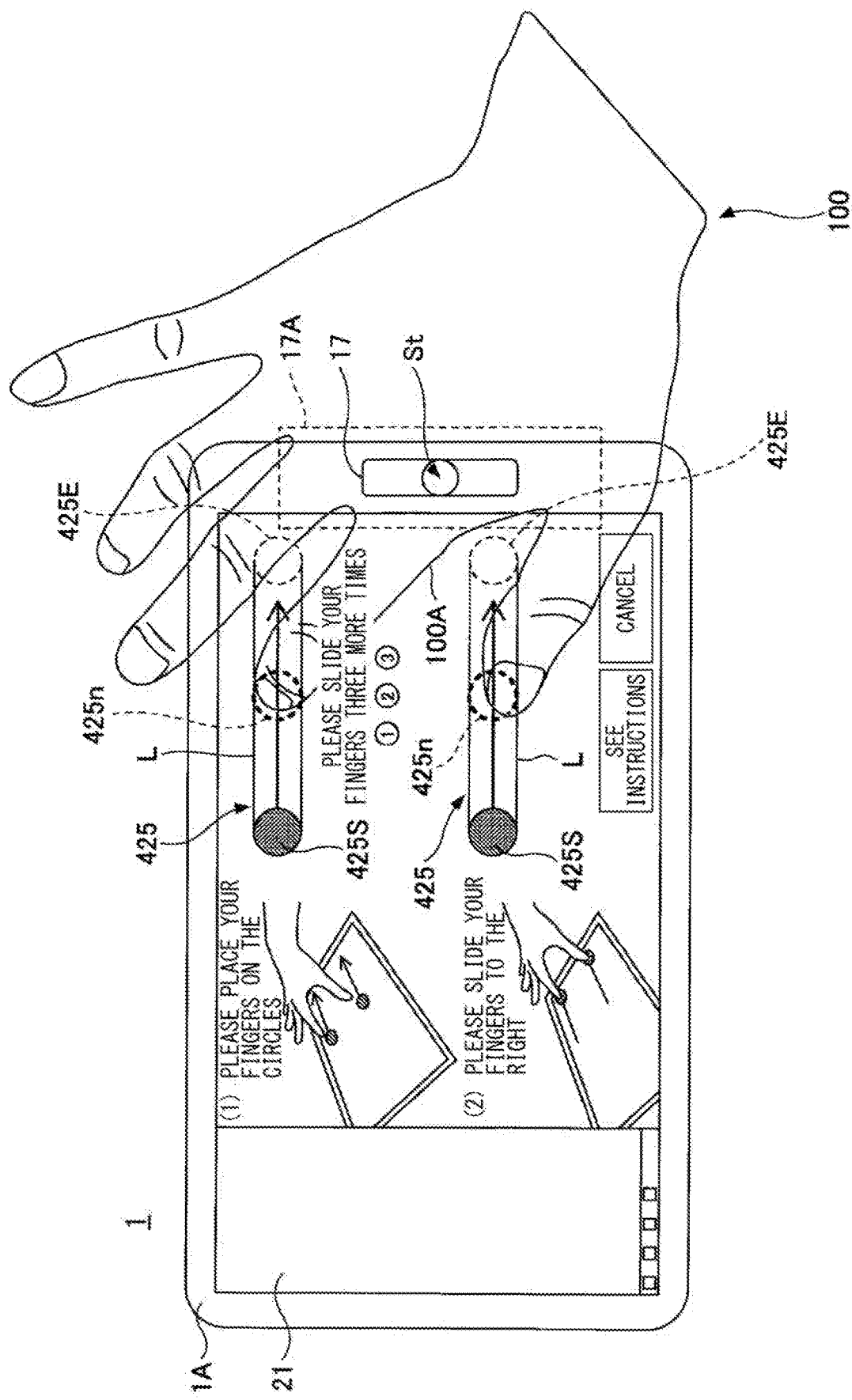
FIG. 8 is a diagram for explaining a reading operation using a guidance screen according to one embodiment.
Figure 9:
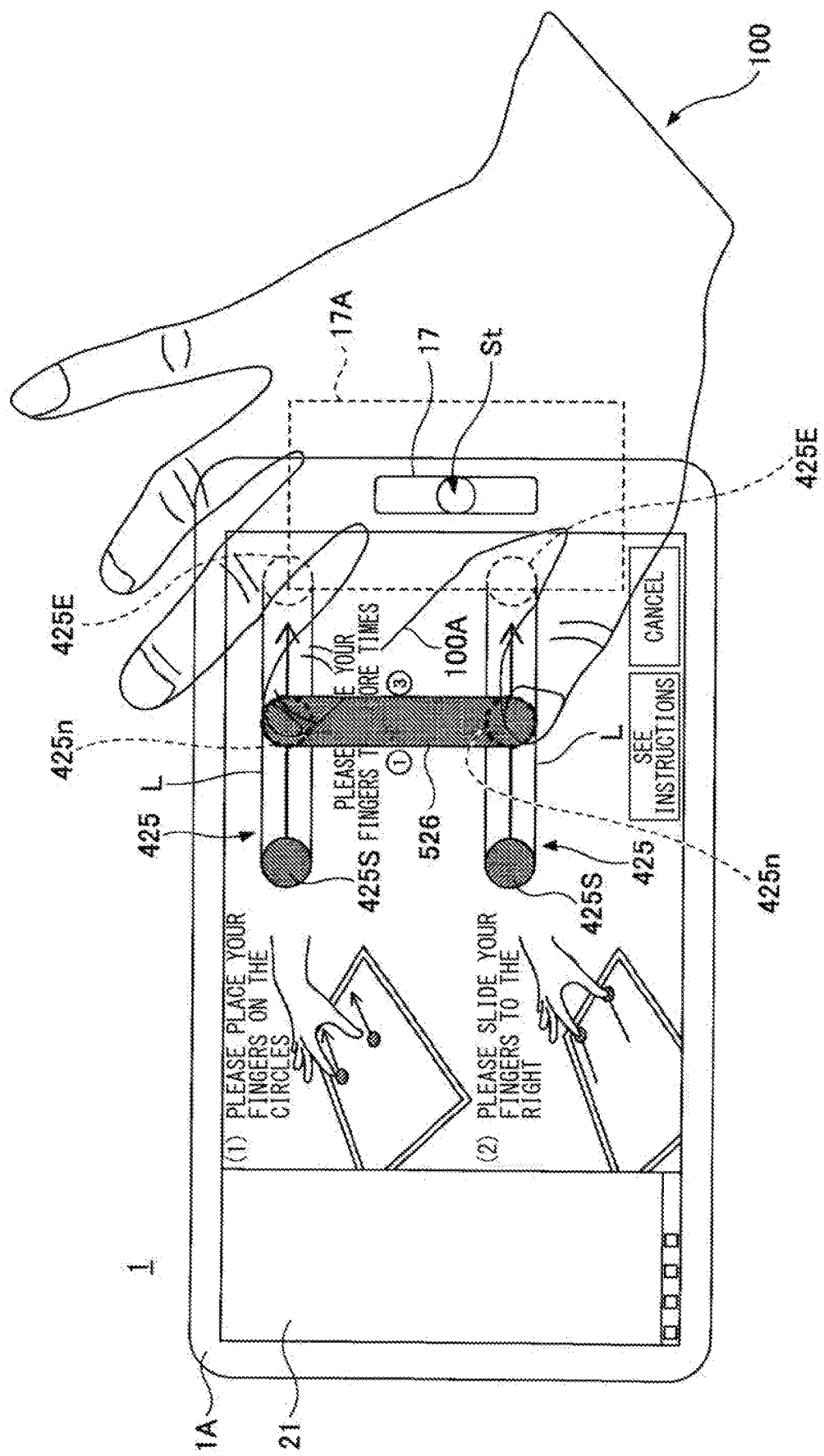
FIG. 9 is a diagram for explaining a reading operation using a guidance screen according to one embodiment.
Figure 10:
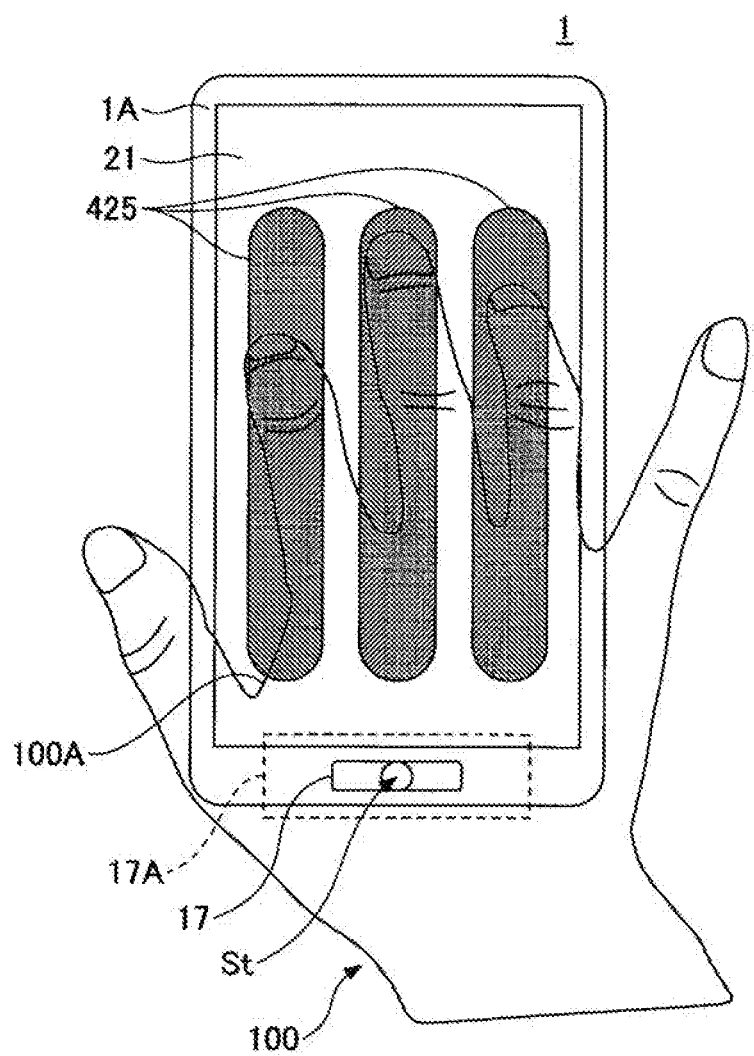
FIG. 10 is a diagram for explaining a reading operation using a guidance screen according to one embodiment.

FIG. 8 to FIG. 10 are diagrams for explaining examples of a biometric information reading operation. The reading operation in this case refers to a touch-and-slide movement of the user's fingers in accordance with guide displays.

FIG. 8 illustrates a side view of a terminal device 1 operated by a user 100. In the example illustrated in FIG. 8, two touch areas 425, each including a guide line L, a starting guide button 425S, a guide button 425n and an end guide button 425E, are presented on the internal display 21 of the terminal device 1.

The user 100 simultaneously swipes the tips of the fingers (in this example, the thumb and the index finger) across the two touch areas 425. During that time, the camera 17 captures images of the palm 100A within an imaging range 17A. When the user 100 performs the operation to simultaneously touch and slide multiple fingertips across the touch areas 425, the angle of the palm 100A with respect to the internal display 21 remains stable and does not largely change while the multiple fingertips are simultaneously sliding over the internal display 21. For this reason, it is possible to reduce relative angular deviation between the terminal device 1 and the hand of the user 100, thereby allowing the palm 100A to be stably imaged by the camera 17.

Additionally, in the present embodiment, in terminal devices 1 in which the internal displays 21 are of different sizes, the touch areas 425 indicating the biometric information reading operations are shown at the same positions when viewed from a reference point St on the camera 17. For this reason, in the case of each of the terminal devices 1 having internal displays 21 of different sizes, the relative angular deviation between the terminal device 1 and the hand of the user 100 can be reduced and the palm 100A can be stably imaged by the camera 17.

In FIG. 8, the two guide lines L of the touch areas 425 are presented so as to each be continuous on the internal display 21, but they may be presented in dashed form.

In this example, the display unit 37 presents, on the internal display 21, in accordance with control by the CPU 11, a starting guide button 425S indicating the operation starting position, a guide line L and an end guide button 425E indicating the operation end position for each touch area 425. At this time, it is possible to present the guide line L, the starting guide button 425S, the guide button 425n and the end guide button 425E differently for a touch area 425 in which the operation has been completed and a touch area 425 for which the operation has not been completed, by changing the darkness or lightness of the colors or the types of lines.

In this example, as illustrated in FIG. 8, the guide buttons 425n indicating the points being operated are shown at the centers of the guide lines L. The display unit 37 indicates the movement direction using arrows. A guide button 425n indicating a point, on an array on a guide line L, through which a finger has passed due to the operation by the user 100 may be presented with dark hatching. Additionally, a portion of a guide line L over which the user 100 has not performed the operation may be presented with light hatching. Thereafter, in a similar manner, each time the fingers of the user 100 performing the operation pass over one of n(n=2, 3, . . . , x−1) points arrayed on the guide line L, the guide buttons 425n that have passed that point may be presented in darker hatching and guide buttons 425n that have not passed that point may be presented in lighter hatching.

In one of the touch areas 425, the imaging target of the biometric imaging unit 42 may be set to be a position on the palm 100A towards the wrist of the user 100, and in the other touch area 425, the imaging target of the biometric imaging unit 42 may be set to be a position on the palm 100A towards the fingertips of the user 100.

As in the example illustrated in FIG. 9, it is possible to present a single operation indicator 526 as a common guide for multiple touch areas 425. The single operation indicator 526 is in the shape of a bar. In this case also, it is possible to stably image the palm 100A by means of the camera 17. In this case, the display of the guidance screen for guiding the biometric information reading operation may comprise multiple touch areas 425 and a single operation indicator 526.

The user 100 performs a touch operation along the guide lines L while observing the touch areas 425. At this time, according to the display of the guidance screen illustrated in FIG. 9, it is possible to show the operation indicator 526 in the form of a bar that can be seen between the fingers of the user 100, thereby facilitating finger touch operations along the touch areas 425. The shape and the display format of the operation indicator 526 joining the two touch areas 425 into one are not particularly limited.

It is possible to arrange the touch areas 425 illustrated in FIGS. 8 and 9 such that, for example, the guide display in a touch area 425 is updated each time one of the fingers used by the user 100 to perform the operation passes n(n=2, 3, . . . , x−1) points in the array on a guide line L, as long as a touch operation has been performed with respect to one of the touch areas 425, even if a touch operation is not performed on the other touch area 425. In this case, the guide displays may be updated by presenting both guide buttons 425n on the two guide lines L so that the operated guide button 425n is presented with dark hatching and the guide button 425n that did not pass the points is presented with light hatching. In this case, it is possible to reduce the amount of computation compared with the case in which the touch areas 425 are updated so as to prompt the next touch in accordance with operations to the two touch areas 425 respectively. Additionally, it is possible to present only one touch area 425 on the guidance screen.

However, when the time at which imaging by the camera 17 is to be started is determined on the basis of only the operation of a single guide line L, there is a possibility that states in which the hand orientation is not stable will be permitted. For this reason, it is preferable for multiple touch areas 425 to be presented on the guidance screen, and in particular, the determination of when to start imaging by the camera 17 is preferably made on the condition that touch operations are simultaneously performed with respect to multiple guide lines L.

As illustrated in FIG. 10, it is possible to present three touch areas 425 vertically on a terminal device 1 that is arranged so as to be longer in the vertical direction. In this case, the user 100 simultaneously swipes the three touch areas 425 with the fingertips (in this example, the index finger, the middle finger and the ring finger), and during that time, the camera 17 images the palm 100A within the imaging range 17A. When the user 100 performs a simultaneous slide instruction across the touch areas 425 using multiple fingertips, the angle of the palm 100A with respect to the touch panel 18 remains stable and does not largely change while the multiple fingertips are simultaneously sliding over the touch panel 18. For this reason, it is possible to reduce relative angular deviation between the terminal device 1 and the hand of the user 100, thereby allowing the palm 100A to be stably imaged by the camera 17.

BIOS Process

Figure 11:
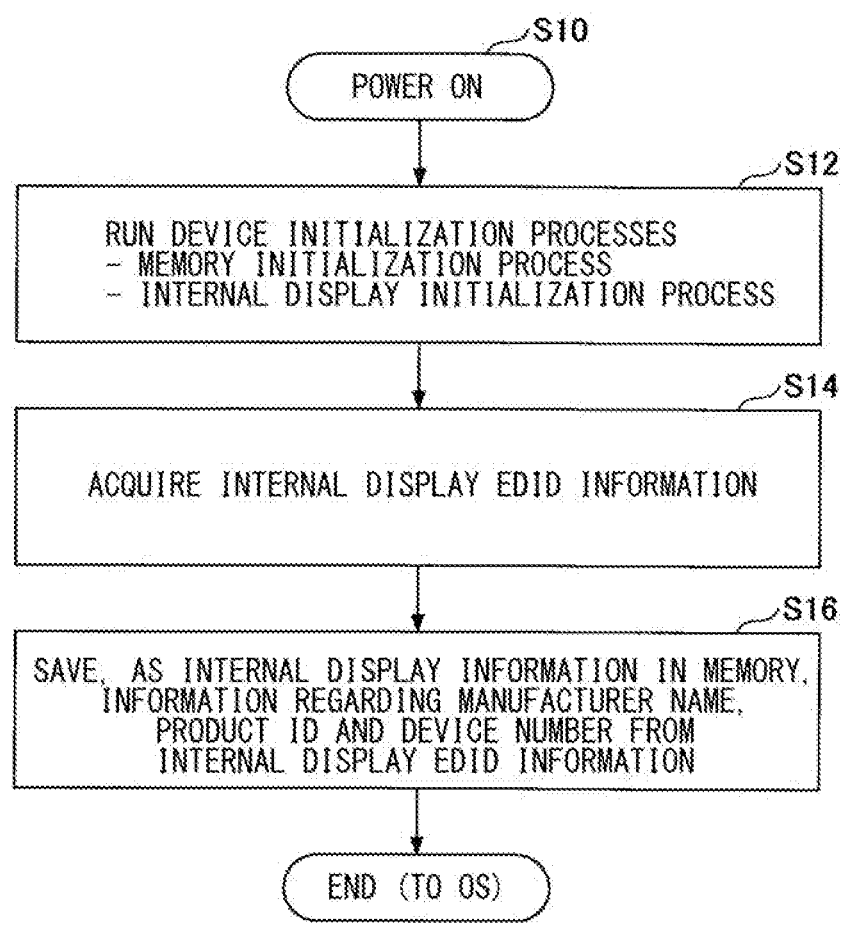
FIG. 11 is a flow chart illustrating an example of a BIOS procedure according to one embodiment.

Next, an example of a BIOS process according to the present embodiment will be explained with reference to FIG. 11. FIG. 11 is a flow chart indicating an example of a BIOS process according to one embodiment. The BIOS process according to the present embodiment is performed, for example, by means of an initialization processing unit 32 and a registration unit 33 implemented in the BIOS 16a.

When the power supply of the terminal device 1 is turned on and the BIOS process is started (step S10), the initialization processing unit 32 executes initialization processes in the devices (step S12). The initialization processes of the devices include an initialization process for the memory 14 and an initialization process for the internal display 21.

Next, the registration unit 33 acquires the EDID information stored in the non-volatile memory 20 in the internal display 21 (step S14). Next, the registration unit 33 saves the manufacturer name, the product ID and the device number from the acquired EDID information, as internal display information, in the internal display information table 38 in the memory 14 (step S16). The BIOS process then ends and the process is transferred to the OS 15a.

Display Control Process

Figure 12:
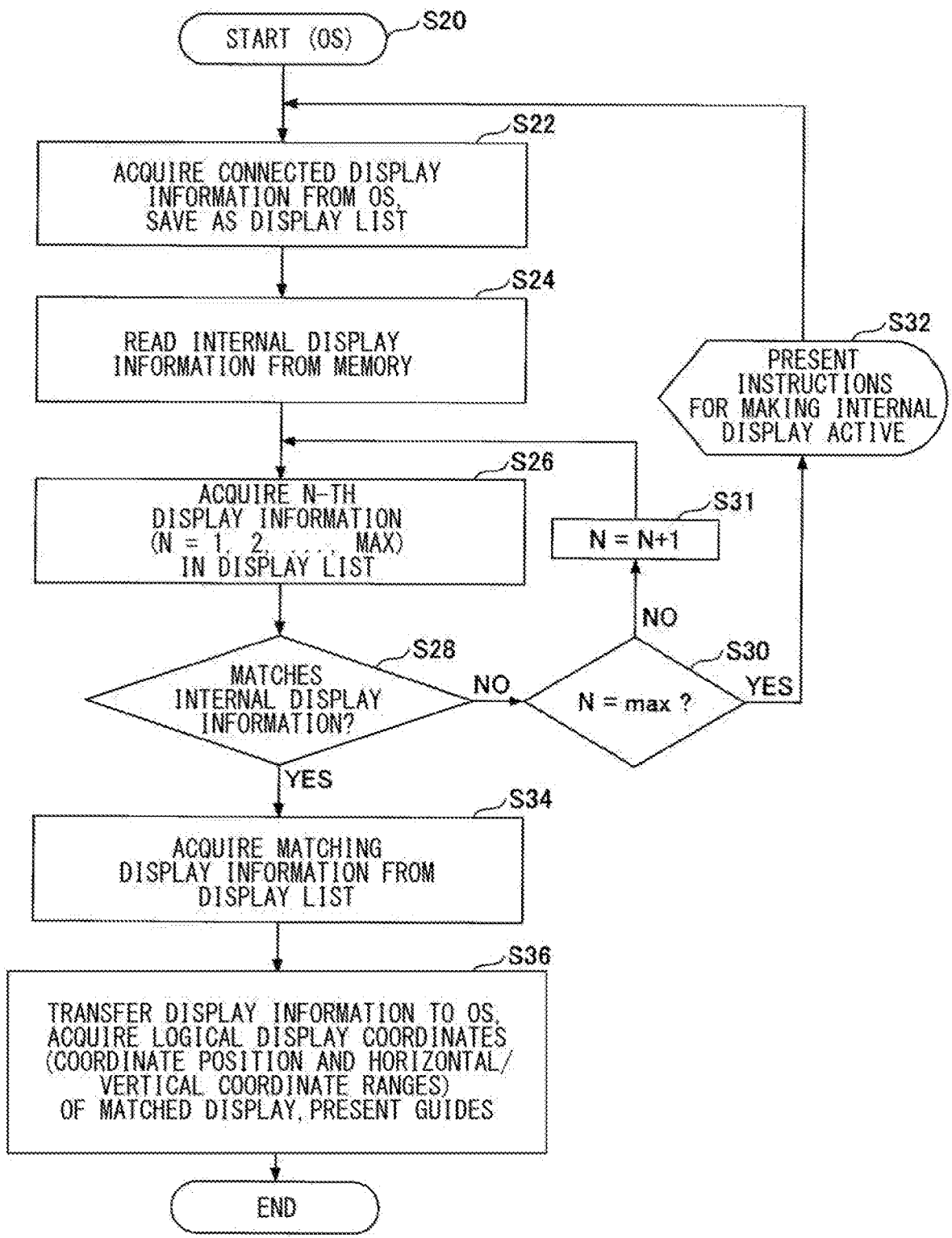
FIG. 12 is a flow chart illustrating an example of a display control process according to one embodiment.

Next, an example of a display control process according to the present embodiment will be explained with reference to FIG. 12. FIG. 12 is a flow chart indicating an example of the display control process according to one embodiment. The display control process according to the present embodiment is performed by a list preparation unit 34, a collation unit 35, an identification unit 36 and a display unit 37 that are implemented, for example, as applications operating on the OS 15a.

When the BIOS process in FIG. 11 ends and the OS 15a is booted, the applications for executing the display control process in accordance with the display control program 40 are activated on the OS 15a, and the main process begins (step S20). The applications are controlled by the CPU 11.

The list preparation unit 34 is connected to the terminal device 1, acquires information on active displays from the OS 15a, prepares a display list and saves the list to the display list table 39 in the memory 14 (step S22).

Next, the collation unit 35 reads internal display information from the internal display information table 38 stored in the memory 14 (step S24). In the present embodiment, the "internal display information" is information regarding the manufacturer name, the product ID and the device number stored in the internal display information table 38. However, the internal display information may include only information regarding the manufacturer name and the product ID, or may also include information regarding the week of manufacture or the year of manufacture.

Next, the collation unit 35 acquires the N-th display information in the display list table 39 (step S26). In the present embodiment, the "display information" refers to the information regarding manufacturer names, product IDs and device numbers stored in the display list table 39. However, the display information may include only information regarding the manufacturer names and the product IDs, or may also include information regarding the weeks of manufacture or the years of manufacture.

The collation unit 35 collates the N-th display information in the display list table 39 with the internal display information in the internal display information table 38 to determine whether or not there is a match (step S28).

If it is determined that the N-th display information does not match the internal display information, the collation unit 35 determines whether or not N is equal to a max value (step S30). If the collation 35 determines that N is not equal to the max value, then N is incremented by one (step S31) and the procedures in step S26 and step S28 are repeated. If the collation unit 35 determines that N is equal to the max value, then the display unit 37 presents a screen providing instructions to make the internal display 21 active (step S32), the procedure returns to step S22, and step S22 and subsequent steps are performed. The screen providing instructions to make the internal display 21 active is an example of a screen prompting the setup of a display having a specific positional relationship with respect to the reading device. In the present embodiment, the display having a specific positional relationship with respect to the reading device is the internal display 21 having a specific positional relationship with respect to the camera 17.

If the collation unit 35 determines that the N-th display information matches the internal display information in step S28, the procedure advances to step S34, and the identification unit 36 acquires the matching display information from the display list table 39. Next, the identification unit 36 transfers the display information to the OS 15a (step S36). The display unit 37 acquires logical display coordinates (the starting coordinate position and the vertical/horizontal coordinate ranges) for the display information matching the internal display information, and presents a guidance screen having the touch areas 425 on the display at the acquired logical display coordinates, i.e., the internal display 21 (step S36). Then, the main procedure ends.

Figure 13:
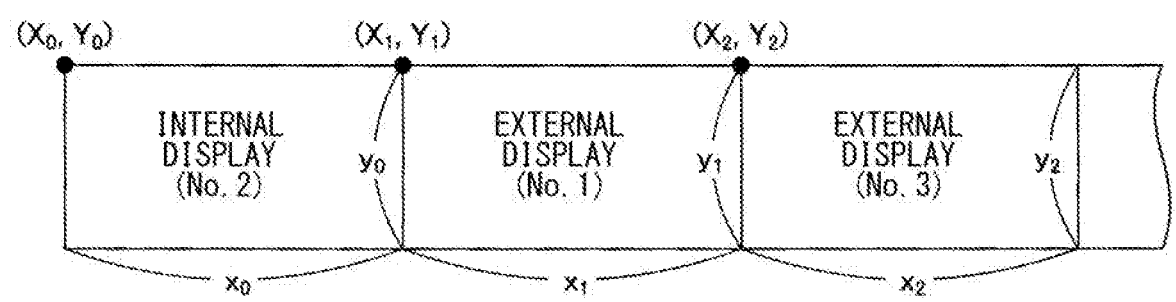
FIG. 13 is a diagram illustrating an example of the logical display coordinates of displays according to one embodiment.

The logical display coordinates of the display information are managed by the OS 15a and indicate display starting coordinate positions and vertical/horizontal coordinate ranges for each of multiple displays connected to the terminal device 1. Examples of logical display coordinates of display information are shown in FIG. 13. For example, the starting coordinate positions and vertical/horizontal coordinate ranges shown in FIG. 13 are preset for the No. 1 and No. 3 external displays and the No. 2 internal display stored in the display list table 39 shown in FIG. 6, and managed by the OS 15a.

For example, the starting coordinate position of the internal display, No. 2, is $(X_0, Y_0)$, the horizontal coordinate range of the internal display is $x_0$ and the vertical coordinate range is $y_0$. Thus, when multiple displays are connected to the terminal device 1, it is possible to present the guidance screen having the touch areas 425 within a predetermined display range in the display screen of the internal display 21 among the displays that are connected.

According to the terminal device 1 of the present embodiment as explained above, EDID information that is stored in the non-volatile memory 20 in the internal display 21 is stored in the memory 14 during a POST process, and an application operating on the OS 15a reads the EDID information from the memory 14 and selects internal display information comprising a manufacturer name, a product ID and a device number from the EDID information. Thus, even if multiple displays are connected to the terminal device 1, it is possible to collate the display information of each of the multiple displays with the internal display information, thereby identifying, as the internal display 21, the display in which the collation results indicated a match. Thus, among the multiple displays connected to the terminal device 1, it is possible to display a guidance screen having touch areas 425 on an internal display 21 that is able to read biometric information. As a result thereof, it is possible to eliminate situations in which biometric information is not read even when operations are performed in accordance with a guidance screen because the guidance screen having the touch areas 425 has been presented on an external display.

Additionally, the BIOS 16a reads the EDID information from the non-volatile memory 20 in the internal display 21 and saves the information to the memory 14 each time the device is booted (including rebooting), so the applications can always acquire the correct EDID information specific to the terminal device 1 that was activated. Thus, there is no need to rewrite the application settings even if the internal display 21 is changed, and it is possible to prevent an external display being misidentified as the internal display 21 due to settings not being changed so that a guidance screen having touch areas 425 is presented on the external display. Furthermore, since the user is not notified of the data structure and the location in the memory 14 at which the EDID information is stored, it is possible to avoid situations in which the user mistakenly rewrites the EDID information from the OS 15a. Additionally, according to the terminal device 1 of the present embodiment, it is possible to identify the internal display 21 without adding any new functions to the applications for controlling the display of the guidance screen.

While the terminal device has been explained by referring to embodiments above, the terminal device according to the present invention is not limited to the above-described embodiments, and various modifications and improvements are possible within the scope of the present invention. Additionally, when there are multiple embodiments and possible modifications, they may be combined within a range not contradicting each other.

What is claimed is:

1. A terminal device comprising:
   a collator that references a storage storing a set of internal display information for identifying an internal display and multiple sets of display information for identifying multiple displays that are connected, and that collates the set of internal display information with the multiple sets of display information;
   an identifier that, based on results from the collation, identifies a display having a specific positional relationship with respect to a biometric information reading device;
   a display device that presents, on the identified display, a screen having a touch area indicating a biometric information reading operation; and
   a registrator that, during a basic input/output system (BIOS) process when booting or rebooting the terminal device, acquires the internal display information and registers the acquired internal display information in the storage,
   wherein the identifier identifies the identified display having the specific positional relationship with respect to the biometric information reading device based on results obtained by collating the acquired internal display information stored in the storage with the multiple sets of display information to find a match.

2. The terminal device according to claim 1,
   wherein, when a display having the specific positional relationship with respect to the biometric information reading device is not identified, the display device presents a screen providing a prompt to set up a display having the specific positional relationship with respect to the biometric information reading device.

* * * * *